United States Patent Office 3,422,635
Patented Jan. 21, 1969

3,422,635
LUBRICATING AND COOLING SYSTEM FOR ELECTRIC MOTORS
Gerhard Trenkowitz, Mannheim, Germany, assignor to Brown, Boveri & Cie AG, Mannheim-Kafertal, Germany, a corporation of Germany
Filed Mar. 21, 1967, Ser. No. 624,901
U.S. Cl. 62—469　　　　　　　　　　　　　　4 Claims
Int. Cl. F25b 43/02; 31/02

ABSTRACT OF THE DISCLOSURE

A lubricating and cooling system for electric motors of the type used in encapsulated refrigerant compressors, these electric motors having bearings and a hollow interior provided with an air gap and passages. A condenser means is provided for condensing a given medium from the gaseous state into the liquid state. A circulating means communicates both with the condenser means and with the motor for providing a forced circulation of the medium in the liquid state from the condenser means to the bearings of the motor and for providing for a forced circulation of the medium in the gaseous state from the motor back to the condenser means where the medium is again changed into the liquid state. In the motor the medium delivered to the bearings is still in the liquid state so as to lubricate the bearings, and the liquid medium which flows from the bearings to the hollow interior of the motor and through the air gap and passages thereof is vaporized by the waste heat of the motor so as to assume the gaseous state in which it is returned by the circulating means to the condenser means.

*Specification*

Figure 1:
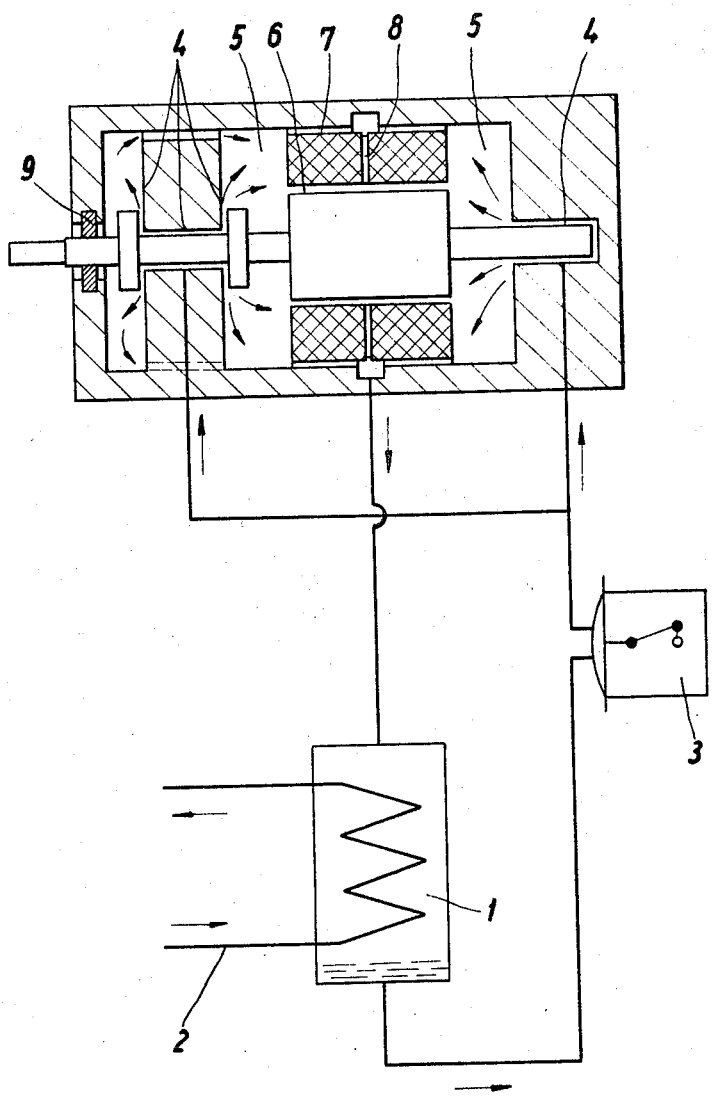

My invention relates to lubricating and cooling systems for electric motors, particularly of the type used in encapsulated refrigerant compressors.

In order to lubricate and cool electric motors, it is customary at the present time to use two different mediums, inasmuch as liquids are required for lubricant purposes while gases are required for cooling purposes.

In installations used for driving compressors, particularly refrigerating installations, where the motor is customarily connected in a gas-tight manner with the compressor to drive the latter, the medium which is compressed and supplied by the compressor is extensively used for cooling the motor. The lubricating material for the motor, however, preferably oil, remains as foreign matter whose entry into the stream of fluid supplied by the compressor is maintained at a relatively low extent by suitable constructive measures, although a complete separation of the lubricant from the medium supplied by the compressor cannot be prevented. It is thus essential to make use at all times of devices which will separate from the compressed medium lubricant taken up by the latter and from the lubricant the compressed medium which is taken up by the lubricant. It is because of these conditions that it is desirable to use the medium which is compressed also for lubricating purposes.

Thus, for the special conditions which are encountered in these cases gas-dynamic types of bearings have been developed in order to solve the lubricating problem, but these measures require considerable technical expenditure.

It is a primary object of my invention to provide a simple and effective structure for avoiding the above drawbacks.

In particular, it is an object of my invention to provide a device capable of advantageously adapting electric motors required to fulfill many different purposes to the particular requirements which they encounter while at the same time assuring a reliable operation particularly with respect to cooling and lubrication of the motors.

My invention makes use of the posibility of influencing the physical state of many mediums, particularly those used in refrigerating installations, by providing a correspondingly chosen operating pressure for the medium, in such a way that the medium is converted from the liquid to the gaseous phase so that lubrication of the motor can be provided by the medium in the liquid phase while cooling of the motor can be provided by the medium in the gaseous or vapor phase.

In accordance with my invention the lubricating and cooling system for electric motors, particularly those used in encapsulated refrigerant compressors, includes a condenser means from which the medium is taken in liquid form and is acted upon by a circulating means so as to undergo a forced circulation to the bearings of the electric motor for lubricating these bearings. The motor has a hollow interior provided with an air gap and passages, and after flowing through the bearings the medium which was in liquid form at the bearings, to lubricate the latter, reaches the hollow interior of the motor to be vaporized by the waste heat of the motor, thus flowing through the air gap and passages of the motor and being directed back to the condenser in gaseous form by the forced circulation of the circulating means of my invention.

As a result there is available for cooling of the motor not only the possible superheating of the vapor but also the considerable vaporizing heat. The amount of cooling medium which must be circulated can therefore be maintained substantially smaller than in the case where only gas cooling is used, so that this amount comes within the range required for the amount of liquid used for lubricating the bearings.

The medium which may be used with the invention can, for example, be Freon in any of the forms: $CCl_3F$ (Freon–11), $CCl_2F_2$ (Freon–12), $CHClF_2$ (Freon–22).

In order to maintain the circulation for such a lubricating and cooling medium, only one pump is required for the relatively small volume of liquid, this pump being situated at the location of the conventional lubricating oil pump. The return flow of the vaporized cooling medium to the condenser takes place automatically as a result of the temperature drop. The devices required up to the present time for circulating the cooling medium in the motor are no longer required with the lubricating and cooling system of my invention.

Figure 2:
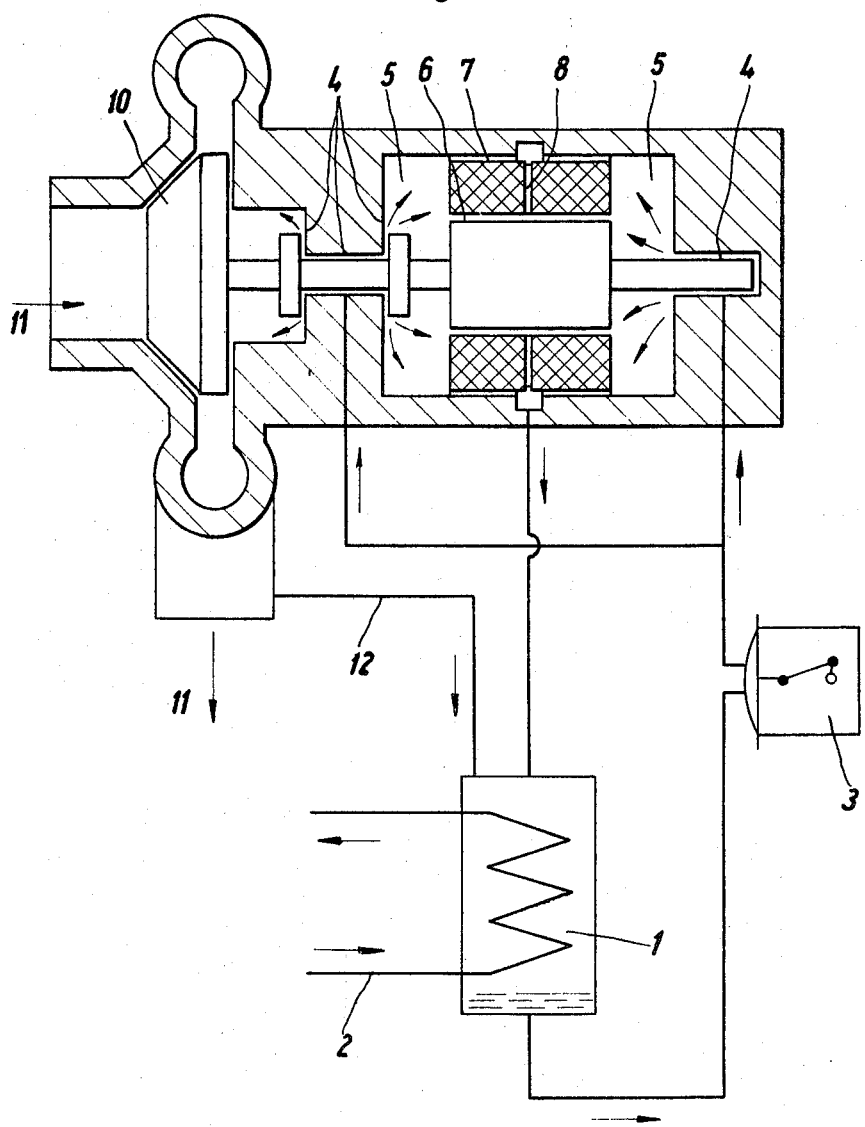

My invention is illustrated by way of example in the accompanying drawings which form part of this application and in which:

FIG. 1 schematically illustrates one possible embodiment of a lubricating and cooling system of my invention for lubricating and cooling a motor; and FIG. 2 schematically illustrates another embodiment of a system of my invention for lubricating and cooling a motor connected to a compressor for driving the latter.

The drawings illustrate in greater detail the construction and layout of the system of my invention.

In the embodiment illustrated in FIG. 1, the medium which is used for lubricating the bearings and for cooling the motor is placed in the liquid state in a condenser or heat exchanger 1 which has a suitable cooling medium 2, such as water, air, or the like, passing therethrough for condensing the vapor into liquid form. A circulating means communicates with the condenser means 1 for providing a forced circulation of the condensed liquid therefrom to the bearings of the motor, and this circulating means includes a pump 3 which preferably operates without oil and which preferably has no stuffing boxes, this pump being, for example, a diaphragm pump. Through this circulating means the liquid is delivered to the bearings 4 of the electric motor at an amount and pressure which maintains the medium in liquid form at the bearings 4, so that no vaporizing of the liquid medium takes place at these bearings. There prevails at the bearings, therefore, a pure friction with the liquid, and the expenditure is considerably less than structures requiring bearings of the gas-dynamic type.

After fulfilling its lubricating function, the medium which is still in liquid form flows beyond the bearings 4 for the most part into the hollow interior 5 of the electric motor. In the hollow interior 5 of the electric motor the liquid medium which flows beyond the bearings 4 is vaporized and absorbs the waste heat of the motor. The motor has in its interior an air gap 6 and advantageously arranged cooling passages 7 and 8, and the vapor which is created in this way in the hollow interior of the motor flows through the air gap and the cooling passages 7 and 8 into a suitably dimensioned connection conduit of the circulating means so as to flow through the latter conduit, as a result of the thermal drop, back to the condenser means or heat exchanger 1, where the medium is again changed into the liquid state.

Thus, with the embodiment of FIG. 1, it is apparent that the above-described technical simplification with its many advantages for the lubrication and cooling of motors can be achieved not only for motors which are designed to be encapsulated with compressors. It is only required with this construction that the shaft of the motor extend outwardly beyond the housing of the motor through a seal provided by a slide ring 9 of known construction, so as to avoid loss of the circulated lubricating and cooling medium.

According to the embodiment of my invention which is illustrated in FIG. 2, the motor need not have a sealing gland, such as the slide ring 9, at the free end of its shaft, since in this embodiment the motor is connected in a gas-tight manner to a compressor 10 which is driven by the motor, and the medium of the fluid stream 11 which is derived from the compressor 10 is used also for circulation through the lubricating and cooling system of my invention. The loss of lubricating medium which flows into the delivery stream of the compressor through the bearing between the compressor and the motor is of no consequence with this construction inasmuch as the same medium is used for cooling and lubricating the motor as for treatment by the compressor. However, make-up of any lost lubricating and cooling medium can be provided by way of the bypass conduit 12 which communicates with the outlet of the compressor to receive part of the fluid compressed thereby so as to direct this latter fluid to the condenser means 1 in the manner shown schematically in FIG. 2. For this purpose the conduit 12 can be provided with a predetermined throttle which corresponds to the loss through the bearing between the motor and compressor, or a suitable adjustable control such as, for example, a float valve, may be provided to automatically open and close the conduit 12 depending upon the elevation of the liquid in the condenser means 1.

This closed lubricating and cooling circuit of my invention, particularly the embodiment thereof shown in FIG. 2, presents with respect to conventional constructions, the following advantages:

No foreign material in the delivery circuit connected to the output of the compressor.

No danger of loss of lubricating medium, since automatic make-up of the loss is possible from the outlet of the compressor.

Maintenance of liquid friction in the bearings, so as to avoid the large costs involved in gas-dynamic bearings.

Cooling of the motor by way of the vaporizable medium while using the heat of vaporization, with a resulting correspondingly small mass which is required to be circulated.

Circulating the lubricating and cooling medium with a circulating means which requires only one liquid pump (replacing the conventional lubricating oil pump), with elimination of all of the circulating and supply devices required up to the present time for cooling the motor.

Good adaptability to the available exterior cooling, such as air, water, or the like and to the operating requirements, since the condenser means need not be an integral component of the motor and, in addition, motor cooling and lubricant cooling takes place in only one heat exchanger.

With compressor installations having a closed circuit, such as those used, for example, in refrigerating processes, the condenser of the entire installation can be used for the circuit of my invention, so that provision of an additional heat exchanger for lubricant and motor cooling is completely unnecessary.

I claim:

1. In a system for lubricating and cooling electric motors having bearings and a hollow interior space provided with an air gap and passages, a fluid dual-purpose medium having both lubricating and cooling properties, condenser means for condensing said medium from a gaseous state into a liquid state, and circulating means communicating with said condenser means and said motor and including a pressure-increasing pump operative independently of said condenser means for providing a forced circulation of the medium in the liquid state from said condenser means to said bearings of said motor, and in the gaseous state from said air gap and passages of said motor back to said condenser means to be condensed into a liquid therein, said medium when in said motor bearings being in the liquid state to lubricate said bearings while when flowing beyond said bearings into the hollow interior of said motor being entirely in gaseous state due to vaporization thereof by the waste heat of the motor.

2. The combination of claim 1 and wherein said pump is a diaphragm pump.

3. The combination of claim 1 for use in a refrigerating installation wherein compressor means are operatively connected in a gas-tight manner to said motor to be driven thereby for compressing a fluid coolant received therein, the fluid coolant being the same as said fluid dual-purpose medium.

4. The combination of claim 3 and wherein said compressor means forms part of a closed circuit installation including a primary circuit wherein said condenser means is connected.

References Cited

UNITED STATES PATENTS 3,306,074  2/1967  Wilson _____ 62—505

MEYER PERLIN, *Primary Examiner.*

U.S. Cl. X.R.

62—505; 310—54